US009813153B2

(12) United States Patent
Parekh et al.

(10) Patent No.: US 9,813,153 B2
(45) Date of Patent: *Nov. 7, 2017

(54) DATA COMMUNICATIONS CABLE WITH WIRELINE CAPACITANCE COMPENSATION

(71) Applicant: Cosemi Technologies, Inc., Irvine, CA (US)

(72) Inventors: Devang Parekh, Sunnyvale, CA (US); Nguyen X. Nguyen, Irvine, CA (US); Chien-Yu Kuo, Irvine, CA (US)

(73) Assignee: Cosemi Technologies, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/186,658

(22) Filed: Jun. 20, 2016

(65) Prior Publication Data
US 2016/0301472 A1    Oct. 13, 2016

Related U.S. Application Data

(63) Continuation of application No. 14/322,683, filed on Jul. 2, 2014, now Pat. No. 9,397,750.

(Continued)

(51) Int. Cl.
*H04B 10/00* (2013.01)
*H04B 10/25* (2013.01)
*G02B 6/42* (2006.01)

(52) U.S. Cl.
CPC ......... *H04B 10/25* (2013.01); *G02B 6/4246* (2013.01); *G02B 6/4277* (2013.01); *G02B 6/4293* (2013.01)

(58) Field of Classification Search
CPC .. H04B 10/25; H04B 10/40; H04B 10/25753; H04B 10/1125; H04B 10/25752;

(Continued)

(56) References Cited

U.S. PATENT DOCUMENTS 4,451,916 A * 5/1984 Casper ............... H04B 10/2504
                                                            370/226
5,430,568 A * 7/1995 Little ................. H04B 10/2525
                                                            385/24

(Continued)

FOREIGN PATENT DOCUMENTS

EP          1978656        10/2008
WO    WO2008119669        10/2008
WO    WO2012059071         5/2012

OTHER PUBLICATIONS

PCT/US12/57520. Int'l Search Report & Written Opinion (Feb. 1, 2013).

(Continued)

*Primary Examiner* — Hibret Woldekidan
(74) *Attorney, Agent, or Firm* — Loza & Loza, LLP; George Fountain

(57) ABSTRACT

A communications cable is disclosed. The cable includes a first circuit configured to receive electrical data signals from a data source via an input connector, and convert the electrical data signals into optical signals for transmission by way of one or more optical fibers. The cable includes a second circuit configured to convert the optical signals received via the one or more optical fibers back to electrical data signals for providing to a data sink via an output connector. The cable includes a third circuit for applying pre- and post-signal conditioning to bi-directional control data for transmission to and received from the data sink via wires. The cable includes a fourth circuit for applying pre- and post-signal conditioning to bi-directional control data for transmission to and received from the data source via wires. The pre- and post-signal conditioning compensate for capacitance and/or resistance effects on the signals introduced by the wires.

16 Claims, 11 Drawing Sheets

Related U.S. Application Data

(60) Provisional application No. 61/842,890, filed on Jul. 3, 2013, provisional application No. 61/982,727, filed on Apr. 22, 2014.

(58) Field of Classification Search
CPC ........ H04B 10/25759; H04B 10/25758; H04B 10/1143; H04B 10/6931; H04B 10/6971; H04B 7/0413; H04B 10/801; H04B 10/1123; H04B 10/2503; H04B 10/25073; H04B 10/2575; H04B 17/40; H04B 1/38; H01L 2924/30111; H01L 2924/30105; G02B 6/4246; G02B 6/4277; G02B 6/4293; H04J 14/0298; H04W 88/085
USPC ........ 398/115–117, 135, 138, 139, 140, 141, 398/158–162
See application file for complete search history.

(56) References Cited

U.S. PATENT DOCUMENTS

| | | | |
|---|---|---|---|
| 5,966,387 A | 10/1999 | Cloutier | |
| 7,155,134 B2* | 12/2006 | Azadet | H04B 10/503 375/286 |
| 7,551,852 B2 | 6/2009 | Reintjes et al. | |
| 7,602,739 B2* | 10/2009 | Weigert | H04B 10/2503 370/276 |
| 7,706,692 B2* | 4/2010 | Tatum | G02B 6/4246 398/139 |
| 7,714,677 B2* | 5/2010 | Wang | H04N 5/148 333/28 R |
| 7,734,183 B2* | 6/2010 | Whitehead | G02B 6/4284 370/463 |
| 7,941,052 B2 | 5/2011 | Epitaux et al. | |
| 8,068,742 B2 | 11/2011 | Cole et al. | |
| 8,233,805 B2* | 7/2012 | Tatum | G02B 6/4201 398/110 |
| 8,251,594 B2* | 8/2012 | Lavoie | H03G 3/3042 361/728 |
| 8,804,792 B1* | 8/2014 | Cheung | H04L 25/03885 375/214 |
| 8,805,195 B2 | 8/2014 | Mateosky et al. | |
| 8,824,898 B2* | 9/2014 | Groepl | G09G 5/006 370/252 |
| 8,831,436 B2 | 9/2014 | Evans et al. | |
| 8,935,740 B2* | 1/2015 | Suzuki | H04B 10/12 725/149 |
| 8,948,197 B2* | 2/2015 | Jiang | G02B 6/4274 370/464 |
| 9,025,971 B2* | 5/2015 | Ide | H04B 10/6933 398/208 |
| 9,397,751 B2* | 7/2016 | Parekh | H04B 10/2503 |
| 9,602,116 B1* | 3/2017 | Le | H03M 1/0604 |
| 2002/0126967 A1* | 9/2002 | Panak | G02B 6/4405 385/101 |
| 2003/0132941 A1 | 7/2003 | Echizenya | |
| 2004/0056732 A1 | 3/2004 | Errington | |
| 2004/0070411 A1* | 4/2004 | Self | G01R 1/07307 324/754.07 |
| 2004/0184746 A1 | 9/2004 | Chang et al. | |
| 2006/0024067 A1 | 2/2006 | Koontz | |
| 2006/0221948 A1 | 10/2006 | Benner et al. | |
| 2006/0268167 A1 | 11/2006 | Cole et al. | |
| 2007/0014522 A1 | 1/2007 | Yamaguchi et al. | |
| 2007/0052869 A1* | 3/2007 | Priest | G06F 13/4045 348/735 |
| 2007/0237463 A1 | 10/2007 | Aronson | |
| 2007/0237470 A1 | 10/2007 | Aronson et al. | |
| 2007/0286600 A1* | 12/2007 | Guo | H04B 10/1143 398/43 |
| 2008/0031629 A1* | 2/2008 | Nguyen | H04B 10/40 398/135 |
| 2009/0260043 A1 | 10/2009 | Tatsuta et al. | |
| 2010/0284323 A1 | 11/2010 | Tang et al. | |
| 2011/0091219 A1* | 4/2011 | Tatum | G02B 6/4201 398/142 |
| 2011/0111642 A1 | 5/2011 | Sloey et al. | |
| 2012/0249871 A1* | 10/2012 | Nguyen | H04B 10/40 348/441 |
| 2013/0147520 A1* | 6/2013 | Payne | H03K 5/249 327/51 |
| 2014/0346325 A1* | 11/2014 | Frank | G01N 15/06 250/214 DC |
| 2015/0110499 A1 | 4/2015 | Jiang et al. | |
| 2015/0295647 A1* | 10/2015 | Parekh | H04B 10/2503 398/142 |

OTHER PUBLICATIONS

PCT/US12/57520. Int'l Prelim. Report of Patentability (Apr. 1, 2014).

PCT/US14/045310. Int'l Search Report & Written Opinion (Nov. 5, 2014).

Chinese Patent Appln. No. 201480038089.9. 1st Office Action (Oct. 28, 2016).

* cited by examiner

DATA COMMUNICATIONS CABLE WITH WIRELINE CAPACITANCE COMPENSATION

CROSS-REFERENCE TO RELATED APPLICATIONS

This application is a continuation of U.S. patent application Ser. No. 14/322,683, filed on Jul. 2, 2014, and entitled "Hybrid Electrical-Optical Data Communications Cable with Wireline Capacitance Compensation," which, in turn, claims the benefit of the filing dates of Provisional Application, Ser. No. 61/842,890, filed on Jul. 3, 2013, and entitled "Consumer Active Optical Cable IC," and Provisional Application, Ser. No. 61/982,727, filed on Apr. 22, 2014, and entitled "Consumer Active Optical Cable with Buffered Control Lines," all of which are incorporated herein by reference.

FIELD

This disclosure relates generally to data communications cables, and in particular, to a hybrid electrical-optical data communications cable with wireline capacitance compensation.

BACKGROUND

Multimedia data, such as audio and video data, are typically communicated from a source of multimedia data (e.g., a digital video recorder (DVR), optical disc player, multimedia distribution facility, etc.) to a sink for the multimedia data (e.g., a television, DVR, audio processing unit, etc.). Generally, data communications cables are employed to route the multimedia data and associated control signals from a source to a sink. Typically, such cables are compliant with one or more data transmission protocols, such as High-Definition Multimedia Interface (HDMI), DisplayPort, and Digital Visual Interface (DVI).

In the past, these data communications cables have been traditionally implemented with exclusively electrical wires. There are several drawbacks with the conventional cables. Generally, the length of the cables is limited to relatively short distances due to the capacitance and resistive loading associated with the electrical wires. Such capacitance and resistive loading have a greater adverse effect on the relatively high speed multimedia data than on the relatively low speed control data. In this regards, the capacitance of the wires generally limit the bandwidth and data rates of the multimedia data. Further, the high speed multimedia data are more susceptible to electromagnetic interference when the data are transmitted over electrical wires. Additionally, the use of electrical wires, in particular with relatively long length cables, causes the cables to be undesirably heavy for handling, transportation, installation, and use.

Thus, there is a need, among other needs, for an improved lighter-weight data communications cable for transmitting high speed multimedia data and low speed control data with greater distances, less signal loss and corruption, and reduced electromagnetic interference.

SUMMARY

An aspect of the disclosure relates to a communications cable comprising an input connector configured for connection to a data source, such as an HDMI-, DisplayPort-, or DVI-compliant data source. The communications cable also comprises an output connector configured for connection to a data sink, such as an HDMI-, DisplayPort-, or DVI-compliant data sink. Additionally, in one embodiment, the communications cable comprises a plurality of optical fibers and wires coupled to the input and output connectors, respectively.

The input connector is configured to receive a first set of electrical data signals from the data source. Examples of the first set of electrical signals are multimedia (e.g., audio/video and associated clock) TMDS differential signals generated by an HDMI-, DisplayPort-, or DVI-compliant data source. The input connector is also configured to receive a second set of electrical data signals from the data source. Examples of the second set of electrical signals include SDA, SCL, and CEC control data signals generated by an HDMI-compliant data source, AUX+ and AUX− control data signals generated by a DisplayPort-compliant source, and DDC DATA and DDC CLOCK control data signals generated by a DVI source.

The input connector is further configured to provide a third set of electrical data signals to the data source, the third set of electrical signals being received from the data sink by way of the output connector and wires, respectively. Examples of the third set of electrical signals include the control-related data signals generated by an HDMI-, DisplayPort-, or DVI-compliant data sink.

The output connector is configured to provide the first set of electrical data signals to the data sink, the first set of electrical data signals being received from the data source by way of the input connector and the optical fibers, respectively. Additionally, the output connector is configured to provide the second set of electrical data signals to the data sink, the second set of electrical data signals being received from the data source by way of the input connector and the wires, respectively. Further, the output connector is configured to receive the third set of electrical data signals from the data sink.

The communications cable further comprises a first circuit (e.g., proximate or at the input connector) configured to convert the first set of electrical signals into optical signals for transmission to the data sink by way of the optical fibers and output connector, respectively. The communications cable also comprises a second circuit (e.g., proximate or at the output connector) to convert the optical signals substantially back to the first set of electrical signals for providing them to the data sink.

The communications cable further comprises a third circuit (e.g., proximate or at the input connector) for applying post-signal conditioning to the third set of electrical signals received from the data sink via the output connector and wires, respectively. The post-signal conditioning compensate for adverse effects (e.g., capacitance and/or resistive effects) on the signals introduced by the wires, and may comprise any one or more of the following: amplifying, buffering, and equalizing the third set of electrical signals.

Similarly, the communications cable further comprises a fourth circuit (e.g., proximate or at the output connector) for applying post-signal conditioning to the second set of electrical signals received from the data source via the input connector and wires, respectively. The post-signal conditioning compensate for adverse effects (e.g., capacitance and/or resistive effects) on the signals introduced by the wires, and may comprise any one or more of the following: amplifying, buffering, and equalizing the third set of electrical signals.

The third circuit of the communications cable may also apply pre-signal conditioning to the second set of electrical signals prior to transmission to the data sink via the wires and output connector, respectively. The pre-signal conditioning also compensates for adverse effects (e.g., capacitance and/or resistive effects) on the signals to be introduced by the wires, and may comprise any one or more of the following: amplifying and pre-emphasizing the second set of electrical signals.

Similarly, the fourth circuit of the communications cable may also apply pre-signal conditioning to the third set of electrical signals prior to transmission to the data source via the wires and input connector, respectively. The pre-signal conditioning also compensates for adverse effects (e.g., capacitance and/or resistive effects) on the signals to be introduced by the wires, and may comprise any one or more of the following: amplifying and pre-emphasizing the third set of electrical signals.

Other embodiments or variants of the aforementioned communications cable are disclosed. Further, other aspects, advantages and novel features of the disclosure will become apparent from the following detailed description of the invention when considered in conjunction with the accompanying drawings.

DETAILED DESCRIPTION OF THE EXEMPLARY EMBODIMENTS

Figure 1:
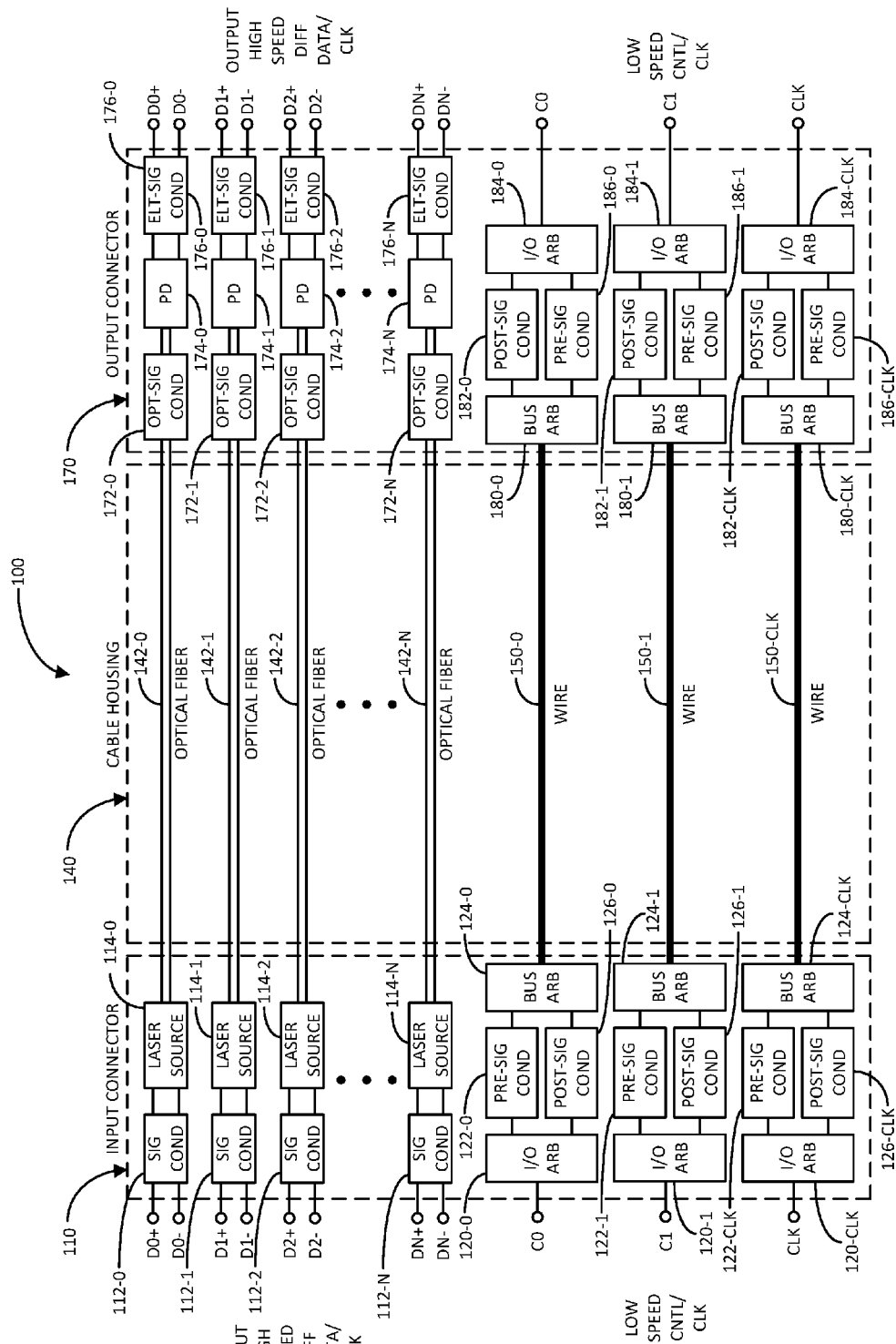
FIG. 1 illustrates a diagram of an exemplary hybrid electrical-optical data communications cable in accordance with an aspect of the disclosure.

FIG. 1 illustrates a diagram of an exemplary hybrid electrical-optical data communications cable 100 in accordance with an aspect of the disclosure. The communications cable 100 comprises an input connector 110, a cable housing 140, and an output connector 170. The input connector 110 is configured to connect with a corresponding connector of a source of high speed data. The high speed data may be multimedia data, such as audio, video, and associated clock. Examples of sources of high speed data include a digital video recorder (DVR), an optical disc player, a multimedia distribution facility, and others.

The high speed data are in the form of electrical digital signals. As an example, the high speed data may be configured as transition-minimized differential signaling (TMDS). For instance, the input connector 110 is configured to receive N number of parallel high speed differential signals D0+/D0−, D1+/D1−, D2+/D2− to DN+/DN−.

The source of high speed data may also serve as a source of low speed control data and associated clock, as well as a sink for low speed control data and associated clock. In this regards, the input connector 110 may be configured to receive parallel low speed control data C0 and C1 and associated clock CLK from the source of high speed data, as well as provide low speed control data C0 and C1 and associated clock to the source of high speed data. The low speed data and associated clock may also be configured as electrical digital signals.

The input connector 110 includes components configured to convert the high speed electrical signals D0+/D0− to DN+/DN− into optical signals for transmission to the output connector 170 by way of optical fibers 142-0 to 142-N, respectively. In this regards, the input connector 110 comprises signal conditioners 112-0, 112-1, 112-2 to 112-N configured to receive the high speed electrical signals D0+/D0−, D1+/D1−, D2+/D2− to DN+/DN−, and generate therefrom suitable voltages for driving laser sources 114-0, 114-1, 114-2 to 114-N, respectively. The laser sources 114-0, 114-1, 114-2 to 114-N, in turn, generate optical signals based on the drive voltages, the optical signals being coupled to the optical fibers 142-0, 142-1, 142-2 to 142-N for transmission to the output connector 170, respectively.

The input connector 110 also includes components for configuring the low speed electrical signals C0, C1, and CLK received from the high speed data source for transmission to the output connector 170 by way of electrically-conductive wires 150-0, 150-1, and 150-CLK, respectively. Additionally, the input connector 110 includes components for receiving low speed electrical signals C0, C1, and CLK from the output connector 170 by way of respective wires 150-0, 150-1, and 150-CLK, and providing the low speed electrical signals to the source of high speed data.

In this regards, the input connector 110 comprises input/output (I/O) arbiters 120-0, 120-1, and 120-CLK, pre-signal conditioners 122-0, 122-1, and 122-CLK, bus arbiters 124-0, 124-1, and 124-CLK, and post-signal conditioners 126-0, 126-1, and 126-CLK. The I/O arbiters 120-0, 120-1, and 120-CLK arbitrate between low speed signals being received from the high speed data source via connector interface (e.g, pins) for C0, C1, and CLK, and low speed signals being transmitted to the high speed data source via the same connector interface for C0, C1, and CLK.

The pre-signal conditioners 122-1, 122-2, and 122-CLK condition the low speed electrical signals C0, C1, and CLK received from the I/O arbiters 120-1, 120-2, and 120-CLK for transmissions via the wires 150-0, 150-1, and 150-CLK, respectively. Because of the communications cable 100 may be used for transmitting signals for long distances, the wires 150-0, 150-1, and 150-CLK may exhibit high capacitance and resistive loss that may have adverse effects on the low speed electrical signals. Accordingly, the pre-signal conditioners 122-1, 122-2, and 122-CLK apply pre-conditioning to the low speed electrical signals C0, C1, and CLK to compensate for the adverse effects associated with the high capacitance and resistive loss of the wires 150-0, 150-1, and 150-CLK, respectively. Examples of pre-conditioning may include any one or more of the following: amplifying the signals, and pre-emphasizing the signals (e.g., providing faster transitions (rise or fall times)).

The bus arbiters 124-1, 124-2, and 124-CLK arbitrate between low speed signals C0, C1, and CLK being transmitted to the output connector 170 by way of the wires 150-0, 150-1, and 150-CLK, and low speed signals C0, C1, and CLK being received from the output connector 170 via the wires 150-0, 150-1, and 150-CLK, respectively.

The post-signal conditioners 126-1, 126-2, and 126-CLK condition the low speed electrical signals C0, C1, and CLK received from the bus arbiters 124-1, 124-2, and 124-CLK for transmissions to the source of high speed data via the I/O arbiters 120-1, 120-2, and 120-CLK, respectively. Similarly, the post-signal conditioners 126-1, 126-2, and 126-CLK apply post-conditioning to the low speed electrical signals C0, C1, and CLK to compensate for the adverse effects associated with the high capacitance and resistive loss of the wires 150-0, 150-1, and 150-CLK, respectively. Examples of post-conditioning may include any one or more of the following: amplification of the signals to account for the resistive loss of the wires, buffering the signals to account for the capacitive load of the wires, and equalizing the signals to negate the effects of the wire capacitance.

The cable housing 140 is configured to protectively enclose the optical fibers 142-0 to 142-N and the wires 150-0 to 150-CLK. Accordingly, the cable housing 140 protects the optical fibers and wires against damage due to handling, transportation, installation, environmental effects, and general use of the communications cable 100. The cable housing 140 may be made of suitable resilient or bendable material useful for routing the communications cable 100.

The output connector 170 includes components configured to convert the optical signals received by way of the optical fibers 140-0 to 142-N back to the high speed electrical signals D0+/D0− to DN+/DN− for providing them to a sink of the high speed data connected to the output connector 170. In this regards, the output connector 170 comprises optical signal conditioners 172-0, 172-1, 172-2 to 172-N to condition the optical signals received by way of the optical fibers 140-0, 140-1, 140-2 to 142-N for efficient coupling to photo detectors 174-0, 174-1, 174-2 to 174-N, respectively. For instance, the optical conditioners 172-0 to 172-N may include lenses and/or other optical components configured to direct substantially all of the optical signals to substantially the most sensitive region of the photo detectors 174-0 to 174-N, respectively. The photo detectors 174-0 to 174-N convert the received optical signals into electrical signals.

The output connector 170 further includes electrical signal conditioners 176-0, 176-1, 176-2 to 176-N configured to apply signal conditioning to the electrical signals generated by the photo detectors 174-0, 174-1, 174-2 to 174-N, respectively. In general, the signal conditioners 176-0 to 176-N are configured to generate the high speed electrical signals D0+/D0− to DN+/DN− from the electrical signals generated by the photo detectors 174-0 to 174-N, respectively. That is, the high speed electrical signals D0+/D0− to DN+/DN− generated by the signal conditioners 176-0 to 176-N should be substantially the same as the high speed electrical signals D0+/D0− to DN+/DN− received by the input connector 110, or least compliant with an associated signal protocol. In this regards, the signal conditioners 176-0 to 176-N may convert the electrical signals from the photo detectors 174-0 to 174-N into differential signals, such as TMDS. Additionally, the signal conditioners 176-0 to 176-N may amplify and/or filter the signals to bring the signals to appropriate levels and reduce unwanted noise from the signals.

The output connector 170 also includes components for receiving low speed electrical signals C0, C1, and CLK from the input connector 110 by way of wires 150-0, 150-1, and 150-CLK, and providing the signals C0, C1, and CLK to the sink of the high speed data connected to the output connector 170. Additionally, the output connector 170 includes components for receiving low speed electrical signals C0, C1, and CLK from the sink of the high speed data, and provide the signals to the wires 150-0, 150-1, and 150-CLK for transmission to the input connector 110, and ultimately, to the source of the high speed data connected to the input connector.

In this regards, the output connector 170 includes components substantially the same or similar to that of input connector 110 for processing the low speed electrical signals. In particular, the output connector 170 comprises bus arbiters 180-0, 180-1, and 180-CLK, post-signal conditioners 182-0, 182-1, and 182-CLK, I/O arbiters 184-0, 184-1, and 184-CLK, and pre-signal conditioners 186-0, 186-1, and 186-CLK.

The bus arbiters 180-1, 180-2, and 180-CLK arbitrate between low speed data C0, C1, and CLK being received from the input connector 110 by way of wires 150-0, 150-1, and 150-CLK, and low speed data C0, C1, and CLK for transmission to the input connector 110 via the wires 150-0, 150-1, and 150-CLK, respectively. The post-signal conditioners 182-1, 182-2, and 182-CLK condition the low speed electrical signals C0, C1, and CLK received from the bus arbiters 180-1, 180-2, and 180-CLK for transmissions to the sink of high speed data, respectively. The post-signal conditioners 182-1, 182-2, and 182-CLK may perform any one or more of: signal amplification, buffering, and equalization to counter the capacitance and resistive effects on the signals introduced by the wires 150-0, 150-1, and 150-CLK, respectively.

The I/O arbiters 184-0, 184-1, and 184-CLK arbitrate between low speed data being received from the high speed data sink via connector interface (e.g, pins) for C0, C1, and CLK, and low speed data being transmitted to the high speed data sink via connector interface for C0, C1, and CLK. The pre-signal conditioners 186-1, 186-2, and 186-CLK condition the low speed electrical signals C0, C1, and CLK received from the I/O arbiters 184-1, 184-2, and 184-CLK for transmission to the input connector 110 via wires 150-0, 150-1, and 150-CLK, respectively. The pre-signal conditioners 186-1, 186-2, and 186-CLK may perform any one or more of: signal amplification and pre-emphasizing to counter the capacitance and resistive effects on the signals that may be introduced by the wires 150-0, 150-1, and 150-CLK, respectively.

In such configuration, the hybrid electrical-optical communications cable 100 is suitable for longer transmission distances. The optical fiber medium of the cable introduces less losses and adverse effects on the high speed signals than would otherwise be introduced by wireline alternative. Also, the optical fiber medium is capable of greater bandwidth, and thus, higher data rates and more signal channels. Additionally, the use of the optical fiber medium better protects the signals against electromagnetic interference, and allows the cable to be lighter to facilitate handling, transportation, installation, and use. Finally, regarding the low speed signals, the communications cable 100 includes pre- and post-signal conditioners to compensate for capacitance and resistive effects on the signals introduced by the wires. This again allows the communications cable 100 to be used in longer transmission distance applications. The following provide a discussion of examples of variants of communications cable 100.

Figure 2:
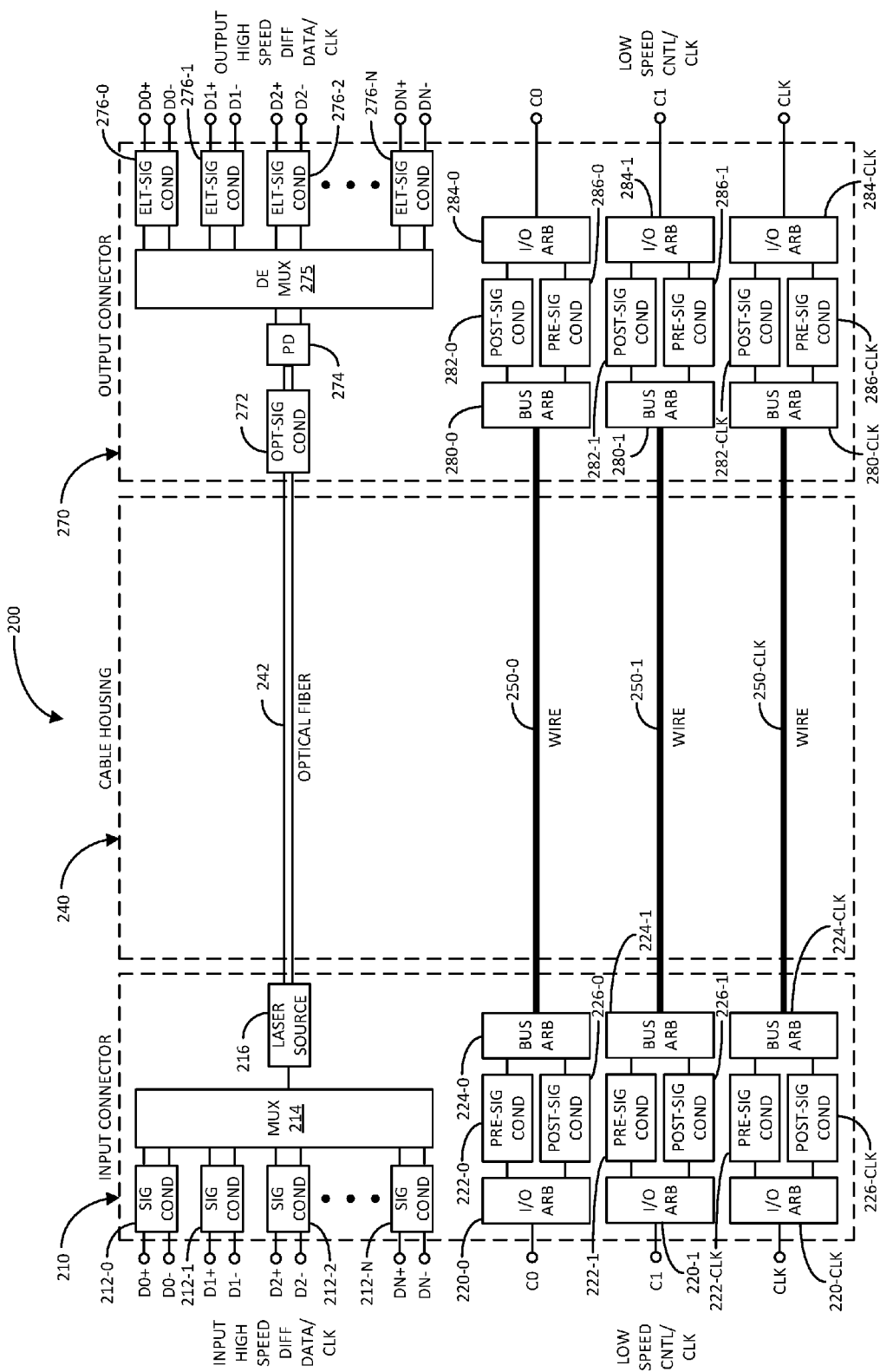
FIG. 2 illustrates a diagram of another exemplary hybrid electrical-optical data communications cable in accordance with another aspect of the disclosure.

FIG. 2 illustrates a diagram of another exemplary hybrid electrical-optical data communications cable 200 in accordance with another aspect of the disclosure. The communications cable 200 is similar to that of communications cable 100, including many of the same or similar elements, as indicated by the same reference numbers, but using a "2" as the most significant digit rather than a "1". The communications cable 200 differs from communications cable 100 in that it has an input connector comprising a multiplexer for multiplexing high speed electrical data signals onto a single optical fiber, and an output connector comprising a de-multiplexer for de-multiplexing the high speed electrical data signals from the single optical fiber.

In particular, the optical communications cable 200 comprises an input connector 210 for connecting to a high speed data source, a cable housing 240 for enclosing the various transmission mediums of the cable, and an output connector 270 for connecting to a high speed data sink.

The input connector 210, in turn, comprises signal conditioners 212-0, 212-1, 212-2 to 212-N for applying signal conditioning to the high speed data D0+/D0−, D1+/D1−, D2+/D2− to DN+/DN− received from the source of high speed data. The input connector 210 further includes a multiplexer 214 to multiplex the conditioned signals from the signal conditioners 212-0 to 212-N. Additionally, the input connector 210 comprises a laser source 216 for generating an optical signal based on the multiplexed signal generated by the multiplexer 214. The optical signal is transmitted to the output connector 270 by way of optical fiber 242 housed in cable housing 240.

The input connector 210 of communications cable 200 includes substantially the same elements as the input connector 110 of communications cable 100 for processing bi-directional low speed electrical signals C0, C1 and CLK transmitted between the input and output connectors 210 and 270 via wires 250-0, 250-1, and 250-CLK housed in the cable housing 240. For instance, the input connector 210 comprises I/O arbiters 220-0, 220-1, and 220-CLK, pre-signal conditioners 222-0, 222-1, and 222-CLK, bus arbiters 224-0, 224-1, and 224-CLK, and post-signal conditioners 226-0, 226-1, and 226-CLK. The detail discussion of these elements has been previously provided with reference to communications cable 100.

The output connector 270, in turn, comprises optical signal conditioner 272, photo detector 274, de-multiplexer 275, and electrical signal conditioners 276-0, 276-1, 276-2, and 276-N. The optical signal conditioner 272 receives the optical signal from the optical fiber 242, and conditions the optical signal for efficient detection by the photo detector 274, as discussed with reference to optical signal conditioners 172-0 to 172-N of communications cable 100. The photo detector 274 generates an electrical signal based on the conditioned optical signal from the optical signal conditioner 272.

The de-multiplexer 275 de-multiplexes the multiplexed high speed data components from the electrical signal generated by the photo detector 274, and provides the signals to the signal conditioners 276-0 to 276-N, respectively. The signal conditioners 276-0 to 276-N applies the appropriate signal conditioners to generate the respective high speed data D0+/D0− to DN+/DN−, as per signal conditioners 176-0 to 176-N of communications cable 100 previously discussed. That is, the signal conditioners 276-0 to 276-N apply signal conditioning so that the generated high speed data D0+/D0− to DN+/DN− is substantially the same as the high speed data D0+/D0− to DN+/DN− received by the input connector 210, or at least compliant with an associated protocol.

The output connector 270 of communications cable 200 includes substantially the same elements as the output connector 170 of communications cable 100 for processing bi-directional low speed electrical signals C0, C1 and CLK transmitted between the input and output connectors 210 and 270 via the wires 250-0, 250-1, and 250-CLK. For instance, the output connector 270 comprises bus arbiters 280-0, 280-1, and 280-CLK, post-signal conditioners 282-0, 282-1, and 282-CLK, I/O arbiters 284-0, 284-1, and 284-CLK, and pre-signal conditioners 286-0, 286-1, and 286-CLK. The detail discussion of these elements has been previously provided with reference to communications cable 100.

Figure 3:
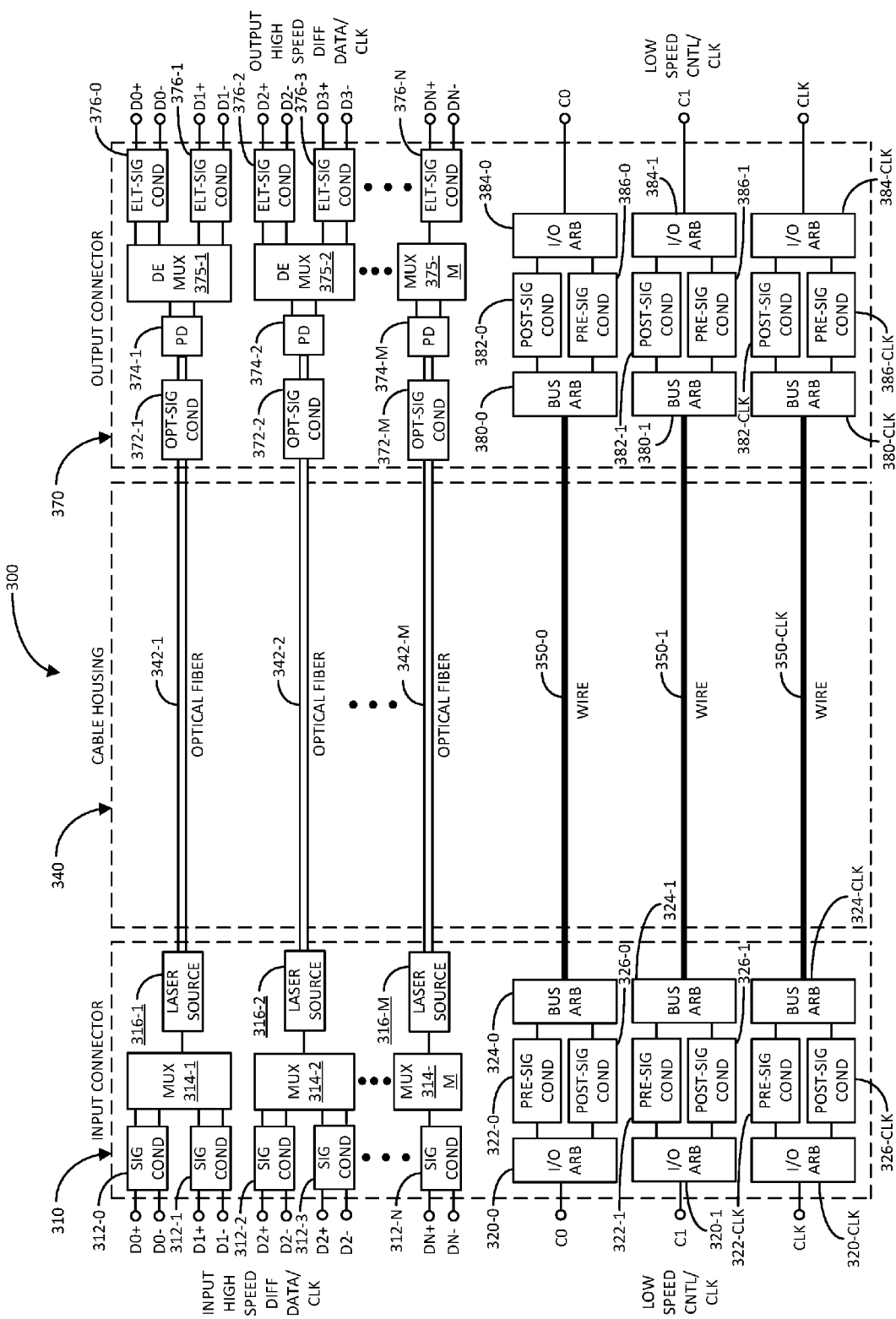
FIG. 3 illustrates a diagram of another exemplary hybrid electrical-optical data communications cable in accordance with another aspect of the disclosure.

FIG. 3 illustrates a diagram of another exemplary hybrid electrical-optical data communications cable in accordance with another aspect of the disclosure. The communications cable 300 is similar to that of communications cable 200 (as well as cable 100), including many of the same or similar elements, as indicated by the same reference numbers, but using a "3" as the most significant digit rather than a "2". The communications cable 300 differs from communications cable 200 in that it includes an input connector comprising a plurality of multiplexers for multiplexing respective portions of high speed data components onto a plurality of optical fibers, and an output connector comprising a plurality of de-multiplexers for de-multiplexing the respective multiplexed portions of the high speed data components from the optical fibers.

In particular, the optical communications cable 300 comprises an input connector 310 for connecting to a high speed data source, a cable housing 340 for enclosing the various transmission mediums of the cable 300, and an output connector 370 for connecting to a high speed data sink.

The input connector 310, in turn, comprises signal conditioners 312-0, 312-1, 312-2, 312-3 to 312-N for applying signal conditioning to the high speed data D0+/D0−, D1+/D1−, D2+/D2−, D3+/D3− to DN+/DN− received from the source of high speed data. The input connector 310 further includes a plurality of multiplexers 314-1, 314-2 to 314-M to multiplex respective portions D0+/D0− and D1+/D1−, D2+/D2−, D3+/D3−, to DN-1+DN-1− and DN+/DN− of the conditioned signals from the signal conditioners 312-0 to 312-N. Additionally, the input connector 310 comprises a plurality of laser sources 316-1, 316-2, to 316-M for generating respective optical signals based on the multiplexed signals generated by the multiplexer 314-1, 314-2 to 314-M, respectively. The optical signals are transmitted to the output connector 370 by way of optical fiber 342-1 to 342-M housed in cable housing 340, respectively. Although, in this example, each of the multiplexers 314-1, 314-2 to 314-M multiplexes two sets of differential signals, it shall be understood that any of the multiplexers may multiplex more than two sets of differential signals.

The input connector 310 of communications cable 300 includes substantially the same elements as the input connector 110 of communications cable 100 for processing bi-directional low speed electrical signals C0, C1 and CLK transmitted between the input and output connectors 310 and 370 via wires 350-0, 350-1, and 350-CLK housed in cable housing 340. For instance, the input connector 310 comprises I/O arbiters 320-0, 320-1, and 320-CLK, pre-signal conditioners 322-0, 322-1, and 322-CLK, bus arbiters 324-0, 324-1, and 324-CLK, and post-signal conditioners 326-0, 326-1, and 326-CLK. The detail discussion of these elements has been previously provided with reference to communications cable 100.

The output connector 370, in turn, comprises optical signal conditioners 372-1, 372-2, to 372-M, photo detectors 374-1, 374-2, to 374-M, de-multiplexer 375-1, 375-2, to 375-M, and electrical signal conditioners 376-0, 376-1, 376-2, 376-3 to 376-N. The optical signal conditioners 372-1, 372-2, to 372-M receive the optical signals from optical fibers 342-1, 342-2, to 342-M, and conditions the optical signals for efficient detection by the photo detectors 374-1, 374-2, to 374-M, as discussed with reference to optical signal conditioners 172-0 to 172-N of communications cable 100. The photo detectors 374-1, 374-2, to 374-M generate electrical signals based on the conditioned optical signals from the optical signal conditioner 372-1, 372-2, to 372-M, respectively.

The de-multiplexers 375-1, 375-2, to 375-M de-multiplex the multiplexed high speed data components from the electrical signals generated by the photo detector 374-1, 374-2, to 374-M, and provide the signals to the signal conditioner pairs 376-0 and 376-1, 376-2 and 376-3, to 376-N−1 and 376-N, respectively. The signal conditioners 376-0 to 376-N apply the appropriate signal conditioning to generate the respective high speed data D0+/D0− to DN+/DN−, as per signal conditioners 176-0 to 176-N of communications cable 100 previously discussed. That is, the signal conditioners 376-0 to 376-N apply the signal conditioning so that the generated high speed data D0+/D0− to DN+/DN− is substantially the same as the high speed data D0+/D0− to DN+/DN− received by the input connector 310, or at least compliant with an associated protocol.

The output connector 370 of communications cable 300 includes substantially the same elements as the output connector 170 of communications cable 100 for processing bi-directional low speed data C0, C1 and CLK transmitted between the input and output connectors 310 and 370 via the wires 350-0, 350-1, and 350-CLK. For instance, the output connector 370 comprises bus arbiters 380-0, 380-1, and 380-CLK, post-signal conditioners 382-0, 382-1, and 382-CLK, I/O arbiters 384-0, 384-1, and 384-CLK, and pre-signal conditioners 386-0, 386-1, and 386-CLK. The detail discussion of these elements has been previously provided with reference to communications cable 100.

Figure 4A:
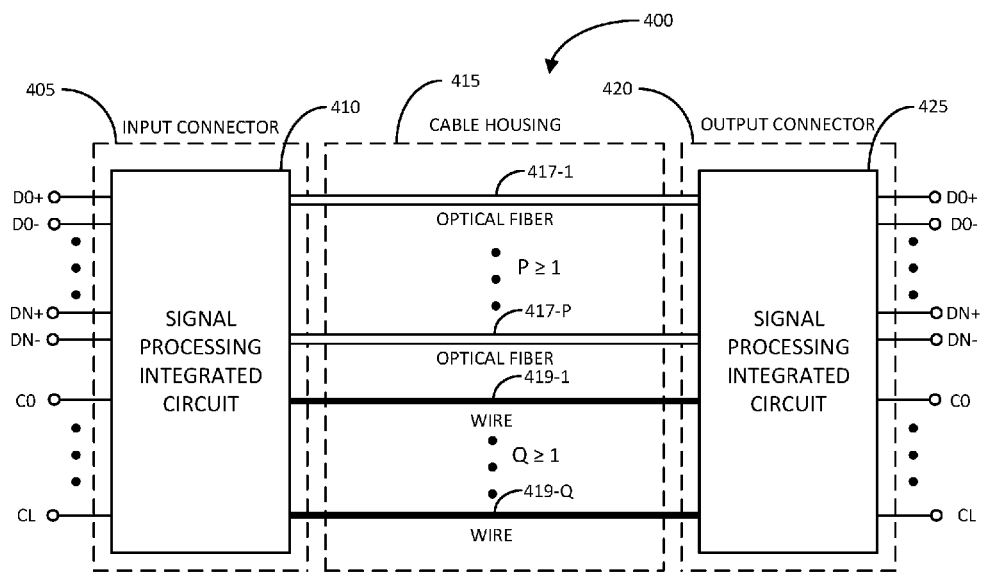
FIGS. 4A-4B illustrate diagrams of yet other exemplary hybrid electrical-optical data communication cables in accordance with another aspect of the disclosure.

FIG. 4A illustrates a diagram of another exemplary hybrid electrical-optical data communications cable 400 in accordance with another aspect of the disclosure. In summary, the communications cable 400 includes respective integrated circuits at the input and output connectors for processing both high speed and low speed data. In particular, the communications cable 400 comprises an input connector 405 for connection to a source of high speed data, a cable housing 415 for protectively enclosing transmission mediums of the cable, and an output connector 425 for connection to a sink of the high speed data.

The input connector 405, in turn, comprises a single integrated circuit 410 for processing the high speed data D0+/D0− to DN+/DN− for transmission to the output connector 420 via one or more optical fibers 417-1 to 417-P, and processing bi-directional low speed data C0 to CL transmitted via one or more wires 417-1 to 417-Q, as discussed with reference to communications cables 100, 200 and 300. Similarly, the output connector 420 comprises a single integrated circuit 425 for processing the high speed data D0+/D0− to DN+/DN− received from the input connector 405 via the one or more optical fibers 417-1 to 417-P, and processing bi-directional low speed data C0 to CL transmitted via one or more wires 417-1 to 417-Q, as discussed with reference to communications cables 100, 200 and 300.

Figure 4B:
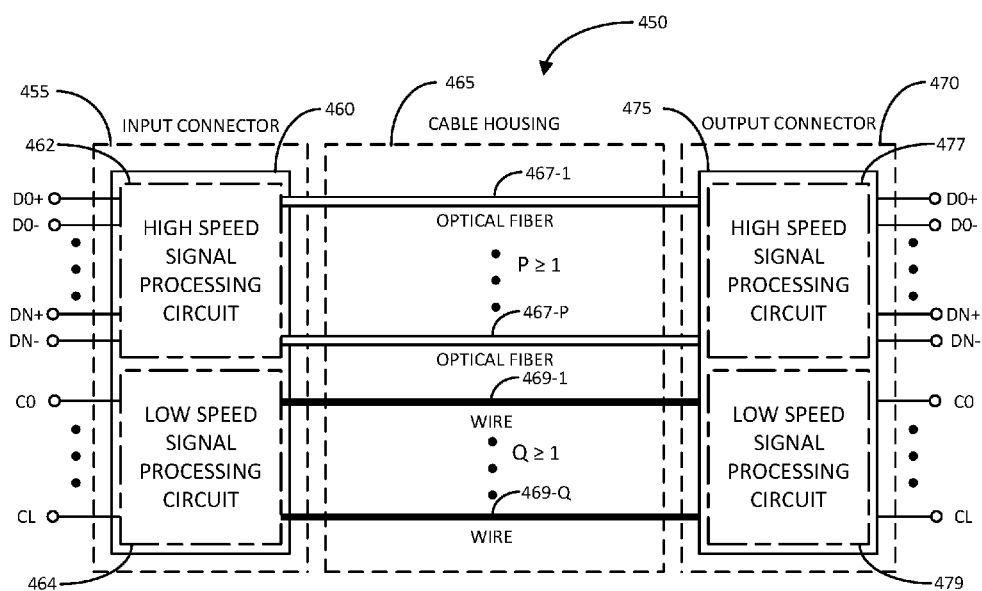

FIG. 4B illustrates a diagram of another exemplary hybrid electrical-optical data communications cable 450 in accordance with another aspect of the disclosure. In summary, the communications cable 450 includes separate integrated circuits in each of the input and output connectors for processing high speed and low speed data, respectively. In particular, the communications cable 450 comprises an input connector 455 for connection to a source of high speed data, a cable housing 465 for protectively enclosing transmission mediums of the cable, and an output connector 470 for connection to a sink of the high speed data.

The input connector 455, in turn, comprises an integrated circuit 462 for processing high speed data D0+/D0− to DN+/DN− for transmission to the output connector 470 via one or more optical fibers 467-1 to 467-P, as per the previous embodiments. The input connector 455 further comprises another integrated circuit 464 for processing bi-directional low speed data C0 to CL transmitted between the input and output connectors 455 and 470 via one or more wires 469-1 to 469-Q, as per the previous embodiments. The integrated circuits 462 and 464 may be disposed on a single substrate 460.

Similarly, the output connector 470 comprises an integrated circuit 477 for processing high speed data D0+/D0− to DN+/DN− received from the input connector 455 via the one or more optical fibers 467-1 to 467-P, as per the previous embodiments. The output connector 470 further comprises another integrated circuit 479 for processing bi-directional low speed data C0 to CL transmitted between the input and output connectors 455 and 470 via the one or more wires 469-1 to 469-Q, as per the previous embodiments. The integrated circuits 477 and 479 may be disposed on a single substrate 475.

Figure 5A:
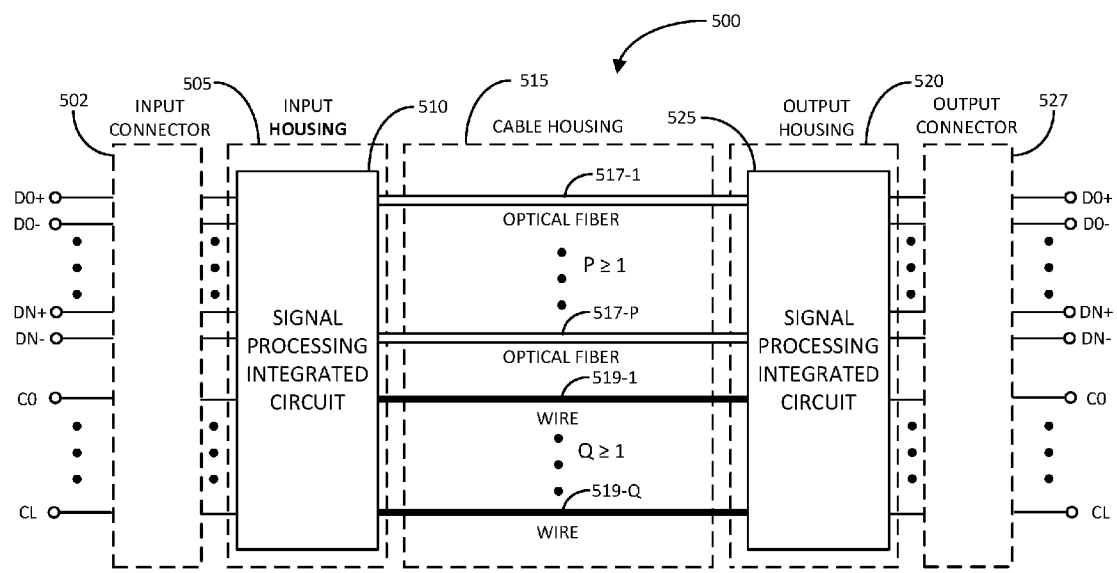
FIGS. 5A-5B illustrate diagrams of still other exemplary hybrid electrical-optical data communication cables in accordance with another aspect of the disclosure.

FIG. 5A illustrates a diagram of another exemplary hybrid electrical-optical data communications cable 500 in accordance with another aspect of the disclosure. In summary, the communications cable 500 includes separate housings, apart from input and output connectors, for housing respective integrated circuits for processing both high speed and low speed data. In particular, the communications cable 500 comprises an input connector 502 for connection to a source of high speed data, an input housing 505 for housing an integrated circuit 510, a cable housing 515 for protectively enclosing transmission mediums of the cable, an output housing 520 for housing another integrated circuit 525, and an output connector 527 for connection to a sink of the high speed data.

As mentioned, the input housing 505 comprises a single integrated circuit 510 for processing the high speed data D0+/D0− to DN+/DN− for transmission to the output connector 527 via one or more optical fibers 517-1 to 517-P, and processing bi-directional low speed data C0 to CL transmitted between the connectors 502 and 527 via one or more wires 517-1 to 517-Q, per the previous embodiments. Similarly, the output housing 520 comprises a single integrated circuit 525 for processing the high speed data D0+/D0− to DN+/DN−received from the input connector 502 via the one or more optical fibers 517-1 to 517-P, and processing bi-directional low speed data C0 to CL transmitted between the connectors 502 and 527 via one or more wires 519-1 to 519-Q, as per the previous embodiments.

Figure 5B:
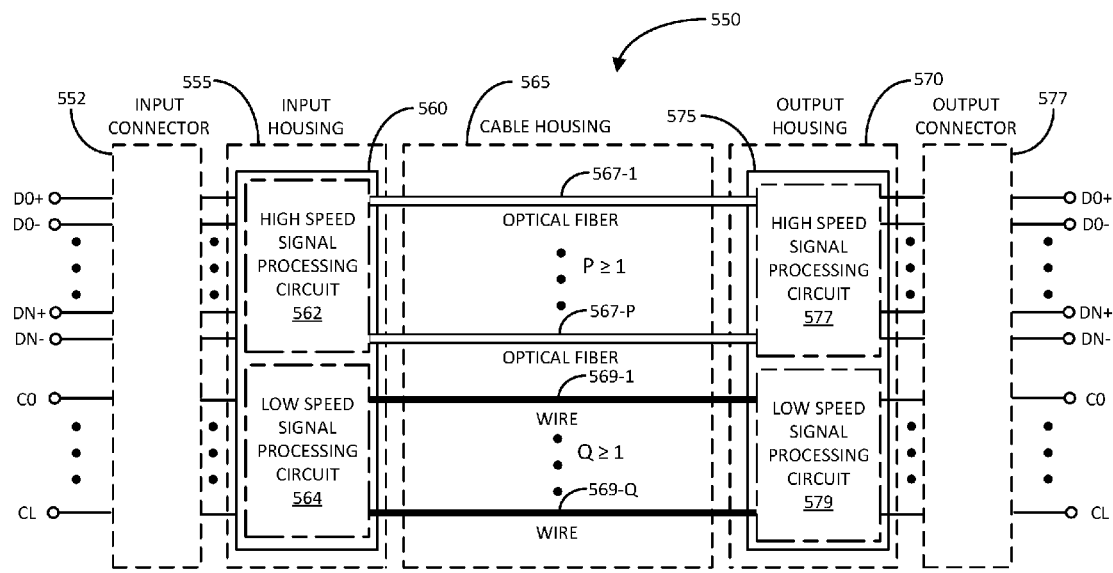

FIG. 5B illustrates a diagram of another exemplary hybrid electrical-optical data communications cable 550 in accordance with another aspect of the disclosure. In summary, the communications cable 550 includes separate housings, apart from the input and output connectors, for each housing a pair of integrated circuits for processing high speed and low speed data, respectively. In particular, the communications cable 550 comprises an input connector 552 for connection to a source of high speed data, an input housing 555 for housing integrated circuits 562 and 564, a cable housing 565 for protectively enclosing transmission mediums of the cable, an output housing 570 for housing integrated circuits 577 and 579, and an output connector 577 for connection to a sink of the high speed data.

As mentioned, the input housing 555 comprises integrated circuit 562 for processing high speed data D0+/D0− to DN+/DN− for transmission to the output connector 577 via one or more optical fibers 567-1 to 567-P, as per the previous embodiments. The input housing 555 further comprises another integrated circuit 564 for processing bi-directional low speed data C0 to CL transmitted between the connectors 552 and 577 via one or more wires 569-1 to 569-Q, as per the previous embodiments. The integrated circuits 562 and 564 may be disposed on a single substrate 560.

Similarly, the output housing 570 comprises an integrated circuit 577 for processing high speed data D0+/D0− to DN+/DN− received from the input connector 552 via the one or more optical fibers 567-1 to 567-P, as per the previous embodiments. The output connector 570 further comprises another integrated circuit 579 for processing bi-directional low speed data C0 to CL transmitted between the connectors 552 and 577 via the one or more wires 569-1 to 569-Q, as per the previous embodiments. The integrated circuits 577 and 579 may be disposed on a single substrate 575.

Figure 6A:
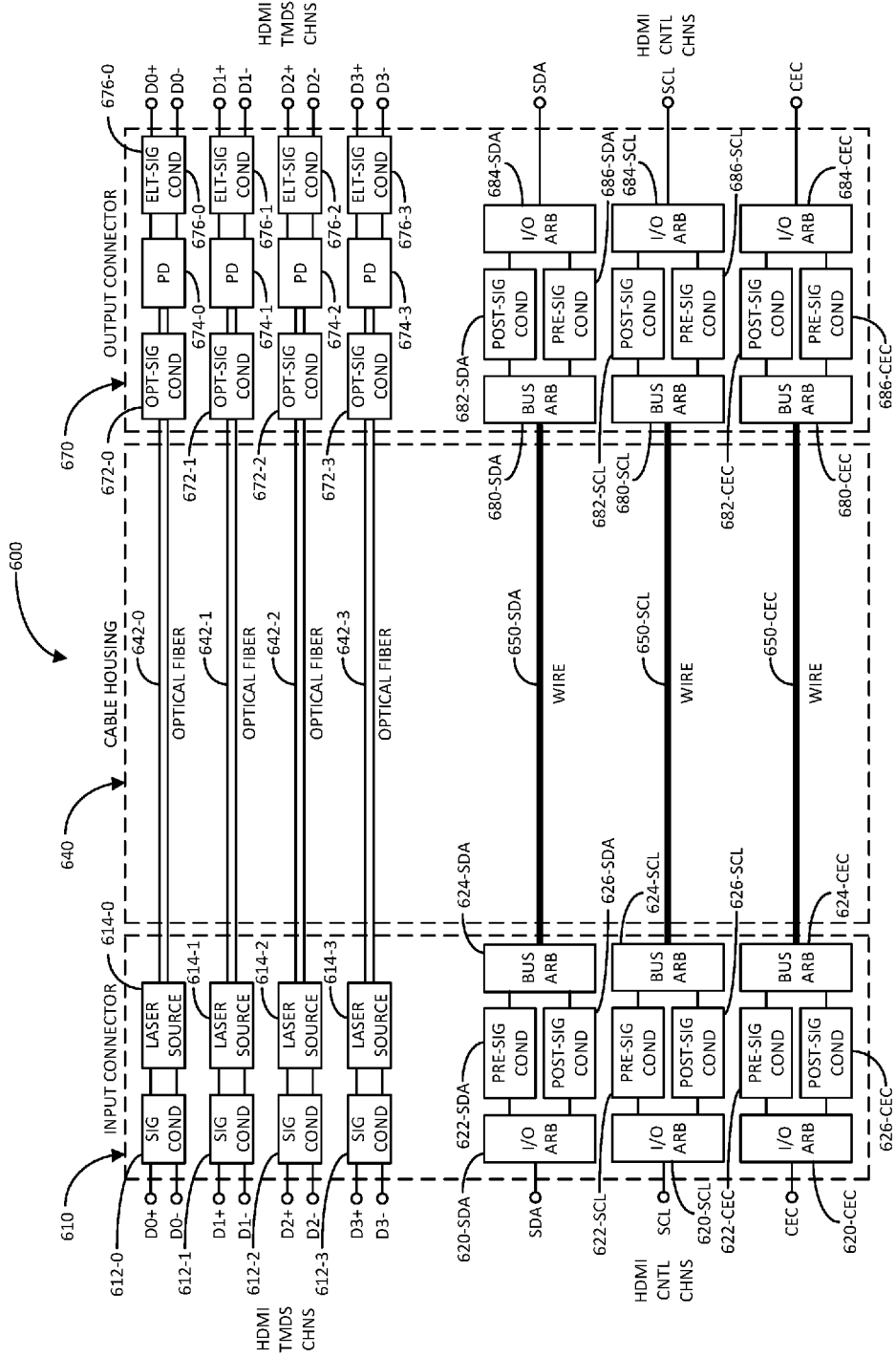
FIGS. 6A-6B illustrate diagrams of exemplary hybrid electrical-optical data communications cables used for transmitting HDMI compliant signals in accordance with another aspect of the disclosure.

FIG. 6A illustrates a diagram of an exemplary hybrid electrical-optical data communications cable 600 configured for transmitting HDMI compliant signals in accordance with another aspect of the disclosure. In summary, the communications cable 600 is configured generally like communications cable 100, but specifically to transmit HDMI compliant signals between an HDMI data source and an HDMI data sink. In particular, the communications cable 600 comprises an input connector 610 for connection to an HDMI data source, a cable housing 640 for protectively enclosing the transmission mediums of the cable, and an output connector 670 for connection to an HDMI data sink.

The input connector 610 comprises signal conditioners 612-0, 612-1, 612-2, and 612-3 and laser sources 614-0, 614-1, 614-2, and 614-3 for converting HDMI TMDS channel data D0+/D0−, D1+/D1−, D2+/D2−, and D3+/D3− received from the HDMI data source into optical signals for transmission to the output connector 670 by way of optical fibers 642-0, 642-1, 642-2, and 642-3, respectively. The input connector 610 also comprises I/O arbiters 620-SDA, 620-SCL, and 620-CEC, pre-signal conditioners 622-SDA, 622-SCL, and 622-CEC, bus arbiters 624-SDA, 624-SCL, and 624-CEC, and post-signal conditioners 626-SDA, 626-SCL, and 626-CEC for processing bi-directional Serial Data (SDA), Serial Clock (SCL), and Consumer Electronics Control (CEC) signals transmitted between the input and output connectors 610 and 670 via wires 650-SDA, 650-SCL, and 650-CEC, respectively.

The output connector 670 comprises optical signal conditioners 672-0, 672-1, 672-2, and 672-3, photo detectors 674-0, 674-1, 674-2, and 674-3, and electrical signal conditioners 676-0, 676-1, 676-2, and 676-3 for converting the optical signals received from the input connector 610 via the optical fibers 642-0, 642-1, 642-2, and 642-3 into HDMI TMDS channel data D0+/D0−, D1+/D1−, D2+/D2−, and D3+/D3− for transmission to the HDMI data sink, respectively. The output connector 670 also comprises bus arbiters 680-SDA, 680-SCL, and 680-CEC, post-signal conditioners 682-SDA, 682-SCL, and 682-CEC, I/O arbiters 684-SDA, 684-SCL, and 684-CEC, and pre-signal conditioners 686-SDA, 686-SCL, and 686-CEC for processing bi-directional SDA, SCL, and CEC signals transmitted between the input and output connectors 610 and 670 via wires 650-SDA, 650-SCL, and 650-CEC, respectively.

Figure 6B:
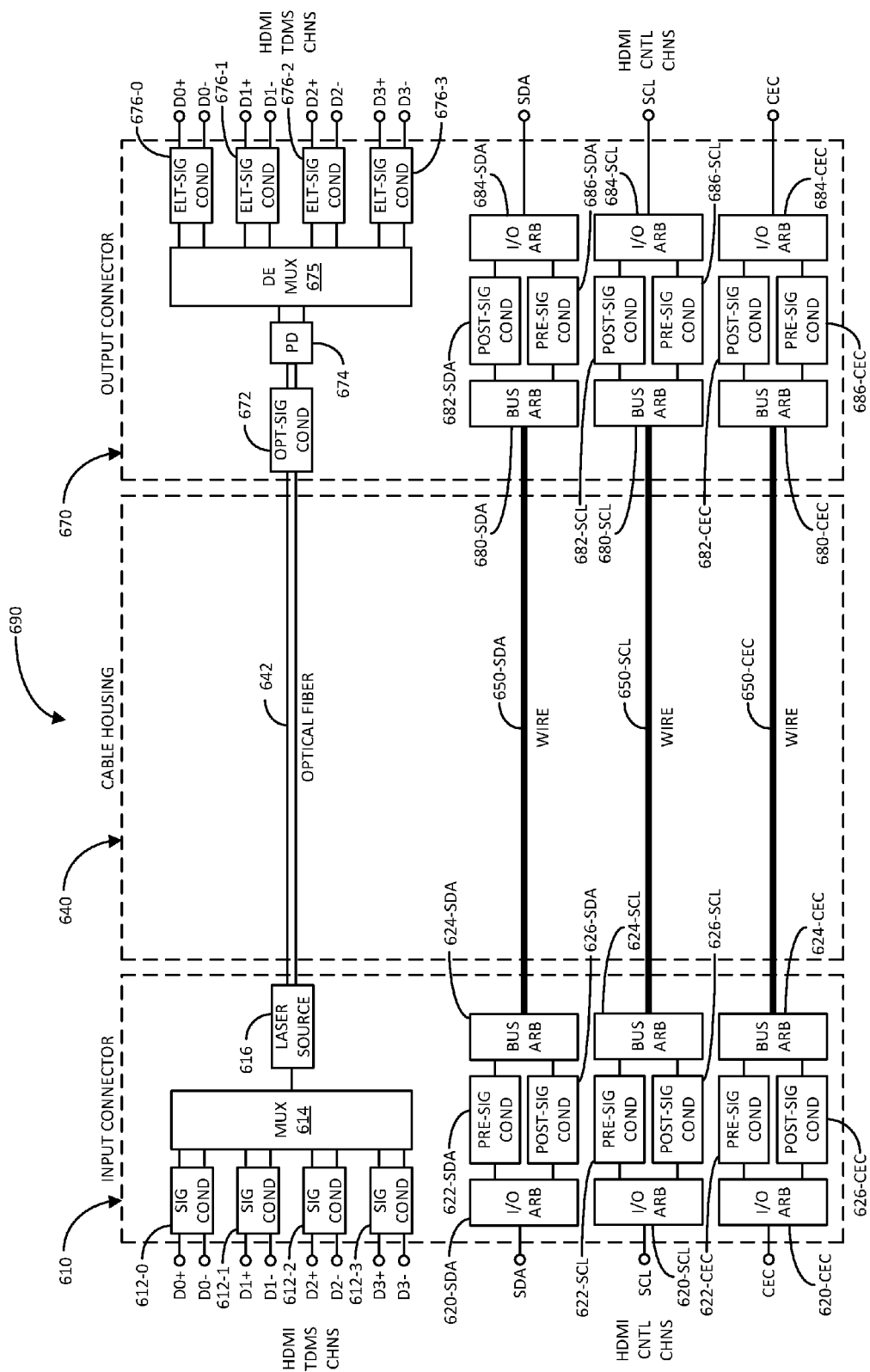

FIG. 6B illustrates a diagram of another exemplary hybrid electrical-optical data communications cable 690 configured for transmitting HDMI compliant signals in accordance with another aspect of the disclosure. In summary, the communications cable 690 is configured generally like communications cable 200, but specifically to transmit HDMI compliant signals between an HDMI data source and an HDMI data sink. In particular, the communications cable 690 comprises an input connector 610 for connection to an HDMI data source, a cable housing 640 for protectively enclosing the transmission mediums of the cable, and an output connector 670 for connection to an HDMI data sink.

The input connector 610 comprises signal conditioners 612-0, 612-1, 612-2, and 612-3, multiplexer 614, and laser source 616 for converting HDMI TMDS channel data D0+/D0−, D1+/D1−, D2+/D2−, and D3+/D3− received from the HDMI data source into a multiplexed optical signal for transmission to the output connector 670 by way of optical fiber 642. The input connector 610 also comprises I/O arbiters 620-SDA, 620-SCL, and 620-CEC, pre-signal conditioners 622-SDA, 622-SCL, and 622-CEC, bus arbiters 624-SDA, 624-SCL, and 624-CEC, and post-signal conditioners 626-SDA, 626-SCL, and 626-CEC for processing bi-directional SDA, SCL, and CEC signals transmitted between the input and output connectors 610 and 670 via wires 650-SDA, 650-SCL, and 650-CEC, respectively.

The output connector 670 comprises optical signal conditioner 672, photo detector 674, de-multiplexer 675, and electrical signal conditioners 676-0, 676-1, 676-2, and 676-3 for converting the multiplexed optical signal received from the input connector 670 via the optical fiber 642 into HDMI TMDS channel data D0+/D0−, D1+/D1−, D2+/D2−, and D3+/D3− for transmission to the HDMI data sink, respectively. The output connector 670 also comprises bus arbiters 680-SDA, 680-SCL, and 680-CEC, post-signal conditioners 682-SDA, 682-SCL, and 682-CEC, I/O arbiters 684-SDA, 684-SCL, and 684-CEC, and pre-signal conditioners 686-SDA, 686-SCL, and 686-CEC for processing bi-directional SDA, SCL, and CEC signals transmitted between the input and output connectors 610 and 670 via wires 650-SDA, 650-SCL, and 650-CEC, respectively.

Figure 7A:
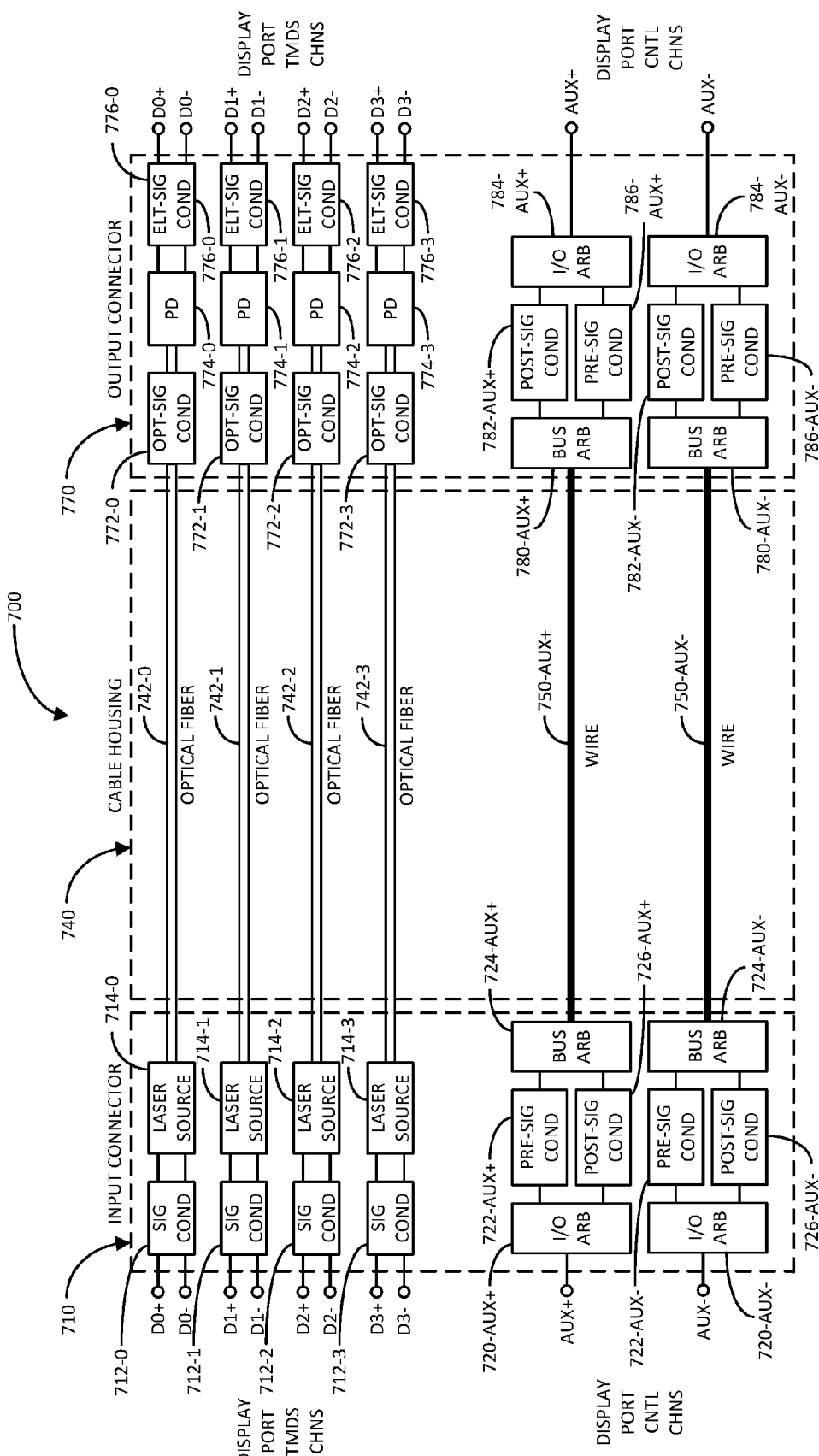
FIGS. 7A-7B illustrate diagrams of exemplary hybrid electrical-optical data communications cables used for transmitting DisplayPort compliant signals in accordance with another aspect of the disclosure.

FIG. 7A illustrates a diagram of exemplary hybrid electrical-optical data communications cable 700 configured for transmitting DisplayPort compliant signals in accordance with another aspect of the disclosure. In summary, the communications cable 700 is configured generally like communications cable 100, but specifically to transmit DisplayPort compliant signals between a DisplayPort data source and a DisplayPort data sink. In particular, the communications cable 700 comprises an input connector 710 for connection to a DisplayPort data source, a cable housing 740 for protectively enclosing the transmission mediums of the cable, and an output connector 770 for connection to a DisplayPort data sink.

The input connector 710 comprises signal conditioners 712-0, 712-1, 712-2, and 712-3 and laser sources 714-0, 714-1, 714-2, and 714-3 for converting DisplayPort TMDS channel data D0+/D0−, D1+/D1−, D2+/D2−, and D3+/D3− received from the DisplayPort data source into optical signals for transmission to the output connector 770 by way of optical fibers 742-0, 742-1, 742-2, and 742-3, respectively. The input connector 710 also comprises I/O arbiters 720-AUX+ and 720-AUX−, pre-signal conditioners 722-AUX+ and 722-AUX−, bus arbiters 724-AUX+ and 724-AUX−, and post-signal conditioners 726-AUX+ and 726-AUX− for processing bi-directional signals AUX+ and AUX− transmitted between the input and output connectors 710 and 770 via wires 750-AUX+ and 750-AUX−, respectively.

The output connector 770 comprises optical signal conditioners 772-0, 772-1, 772-2, and 772-3, photo detectors 774-0, 774-1, 774-2, and 774-3, and electrical signal conditioners 776-0, 776-1, 776-2, and 776-3 for converting the optical signals received from the input connector 710 via the optical fibers 742-0, 742-1, 742-2, and 742-3 into DisplayPort TMDS channel data D0+/D0−, D1+/D1−, D2+/D2−, and D3+/D3− for transmission to the DisplayPort data sink, respectively. The output connector 770 also comprises bus arbiters 780-AUX+ and 780-AUX−, post-signal conditioners 782-AUX+ and 782-AUX−, I/O arbiters 784-AUX+ and 784-AUX−, and pre-signal conditioners 786-AUX+ and 786-AUX− for processing bi-directional AUX+ and AUX− signals transmitted between the input and output connectors 710 and 770 via wires 750-AUX+ and 750-AUX−, respectively.

Figure 7B:
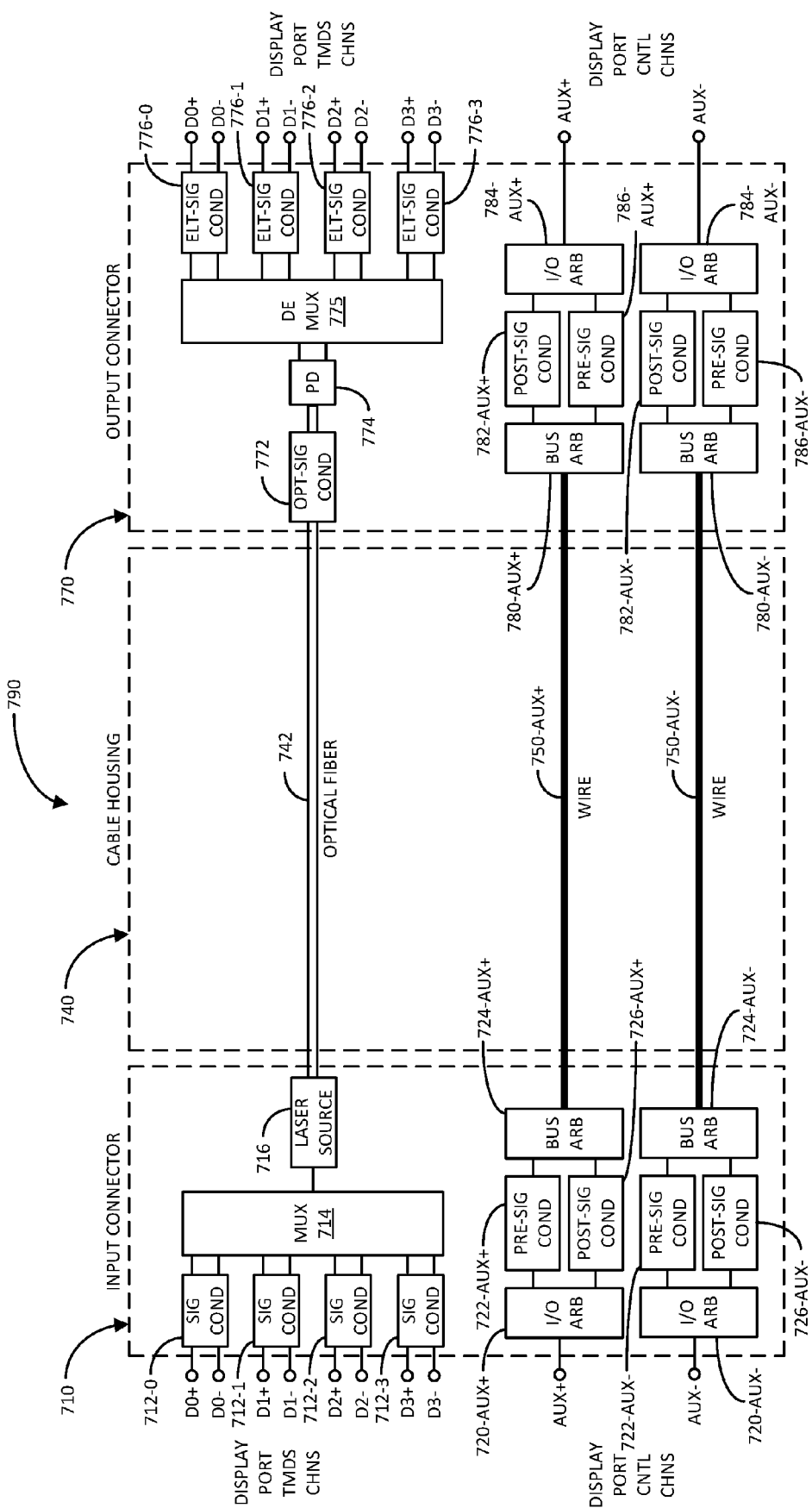

FIG. 7B illustrates a diagram of another exemplary hybrid electrical-optical data communications cable 790 configured for transmitting DisplayPort compliant signals in accordance with another aspect of the disclosure. In summary, the communications cable 790 is configured generally like communications cable 200, but specifically to transmit DisplayPort compliant signals between a DisplayPort data source and a DisplayPort data sink. In particular, the communications cable 790 comprises an input connector 710 for connection to a DisplayPort data source, a cable housing 740 for protectively enclosing the transmission mediums of the cable, and an output connector 770 for connection to a DisplayPort data sink.

The input connector 710 comprises signal conditioners 712-0, 712-1, 712-2, and 712-3, multiplexer 714, and laser source 716 for converting DisplayPort TMDS channel data D0+/D0−, D1+/D1−, D2+/D2−, and D3+/D3− received from the DisplayPort data source into a multiplexed optical signal for transmission to the output connector 770 by way of optical fiber 742. The input connector 710 also comprises I/O arbiters 720-AUX+ and 720-AUX−, pre-signal conditioners 722-AUX+ and 722-AUX−, bus arbiters 724-AUX+ and 724-AUX, and post-signal conditioners 726-AUX+ and 726-AUX− for processing bi-directional AUX+ and AUX− signals transmitted between the input and output connectors 710 and 770 via wires 750-AUX+ and 750-AUX−, respectively.

The output connector 770 comprises optical signal conditioner 772, photo detector 774, de-multiplexer 775, and electrical signal conditioners 776-0, 776-1, 776-2, and 776-3 for converting the multiplexed optical signal received from the input connector 710 via the optical fiber 742 into DisplayPort TMDS channel data D0+/D0−, D1+/D1−, D2+/D2− and D3+/D3− for transmission to the DisplayPort data sink, respectively. The output connector 770 also comprises bus arbiters 780-AUX+ and 780-AUX−, post-signal conditioners 782-AUX+ and 782-AUX−, I/O arbiters 784-AUX+ and 784-AUX−, and pre-signal conditioners 786-AUX+ and 786-AUX− for processing bi-directional signals AUX+ and AUX− transmitted between the input and output connectors 710 and 770 via wires 750-AUX+ and 750-AUX−, respectively.

Figure 8A:
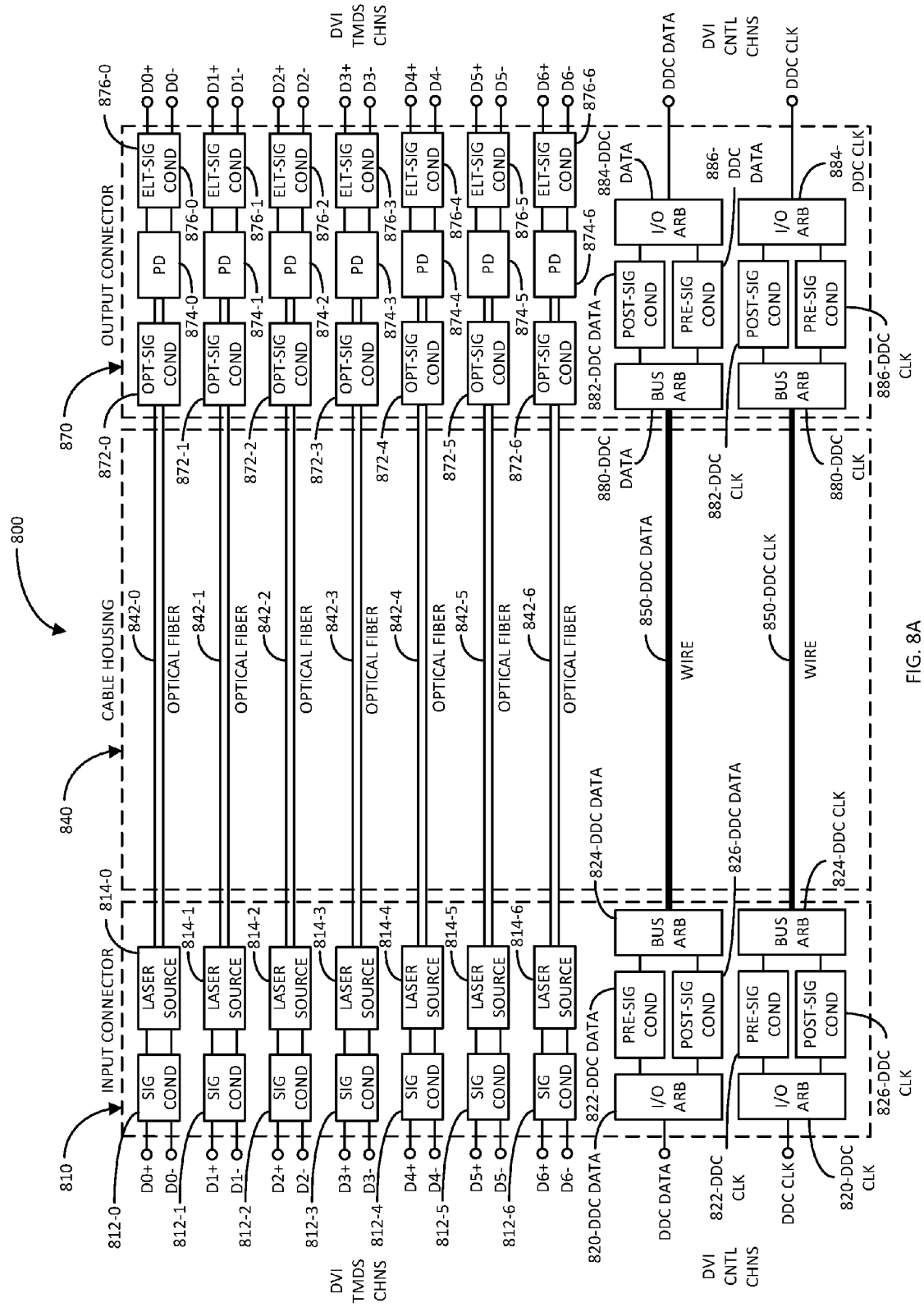
FIGS. 8A-8B illustrate diagrams of exemplary hybrid electrical-optical data communications cables used for transmitting DVI compliant signals in accordance with another aspect of the disclosure.

FIG. 8A illustrates a diagram of exemplary hybrid electrical-optical data communications cable 800 configured for transmitting DVI compliant signals in accordance with another aspect of the disclosure. In summary, the communications cable 800 is configured generally like communications cable 100, but specifically to transmit DVI compliant signals between a DVI data source and a DVI data sink. In particular, the communications cable 800 comprises an input connector 810 for connection to a DVI data source, a cable housing 840 for protectively enclosing the transmission mediums of the cable, and an output connector 870 for connection to a DVI data sink.

The input connector 810 comprises signal conditioners 812-0, 812-1, 812-2, 812-3, 812-4, 812-5, and 812-6 and laser sources 814-0, 814-1, 814-2, 814-3, 814-4, 814-5, and 814-6 for converting DVI TMDS channel data D0+/D0−, D1+/D1−, D2+/D2−, D3+/D3−, D4+/D4−, D5+/D5−, and D6+/D6− received from the DVI data source into optical signals for transmission to the output connector 870 by way of optical fibers 842-0, 842-1, 842-2, 842-3, 842-4, 842-5, and 842-6, respectively. The input connector 810 also comprises I/O arbiters 820-DDC DATA and 820-DDC CLK, pre-signal conditioners 822-DDC DATA and 822-DDC CLK, bus arbiters 824-DDC DATA and 824-DDC CLK, and post-signal conditioners 826-DDC DATA and 826-DDC CLK for processing bi-directional display data channel (DDC DATA) and display data clock (DDC CLK) signals transmitted between the input and output connectors 810 and 870 via wires 850-DDC DATA and 850-DDC CLK, respectively.

The output connector 870 comprises optical signal conditioners 872-0, 872-1, 872-2, 872-3, 872-4, 872-5, and 872-6, photo detectors 874-0, 874-1, 874-2, 874-3, 874-4, 874-5, and 874-6, and electrical signal conditioners 876-0, 876-1, 876-2, 876-3, 876-4, 876-5, and 876-6 for converting the optical signals received from the input connector 810 via the optical fibers 842-0, 842-1, 842-2, 842-4, 842-4, 842-5, and 842-6 into DVI TMDS channel data D0+/D0−, D1+/D1−, D2+/D2−, D3+/D3−, D4+/D4−, D5+/D5−, and D6+/D6− for transmission to the DVI data sink, respectively. The output connector 870 also comprises bus arbiters 880-DDC DATA and 880-DDC CLK, post-signal conditioners 882-DDC DATA and 882-DDC CLK, I/O arbiters 884-DDC DATA and 884-DDC CLK, and pre-signal conditioners 886-DDC DATA and 886-DDC CLK for processing bi-directional signals DDC DATA and DDC CLK transmitted between the input and output connectors 810 and 870 via wires 850-DDC DATA and 850-DDC CLK, respectively.

Figure 8B:
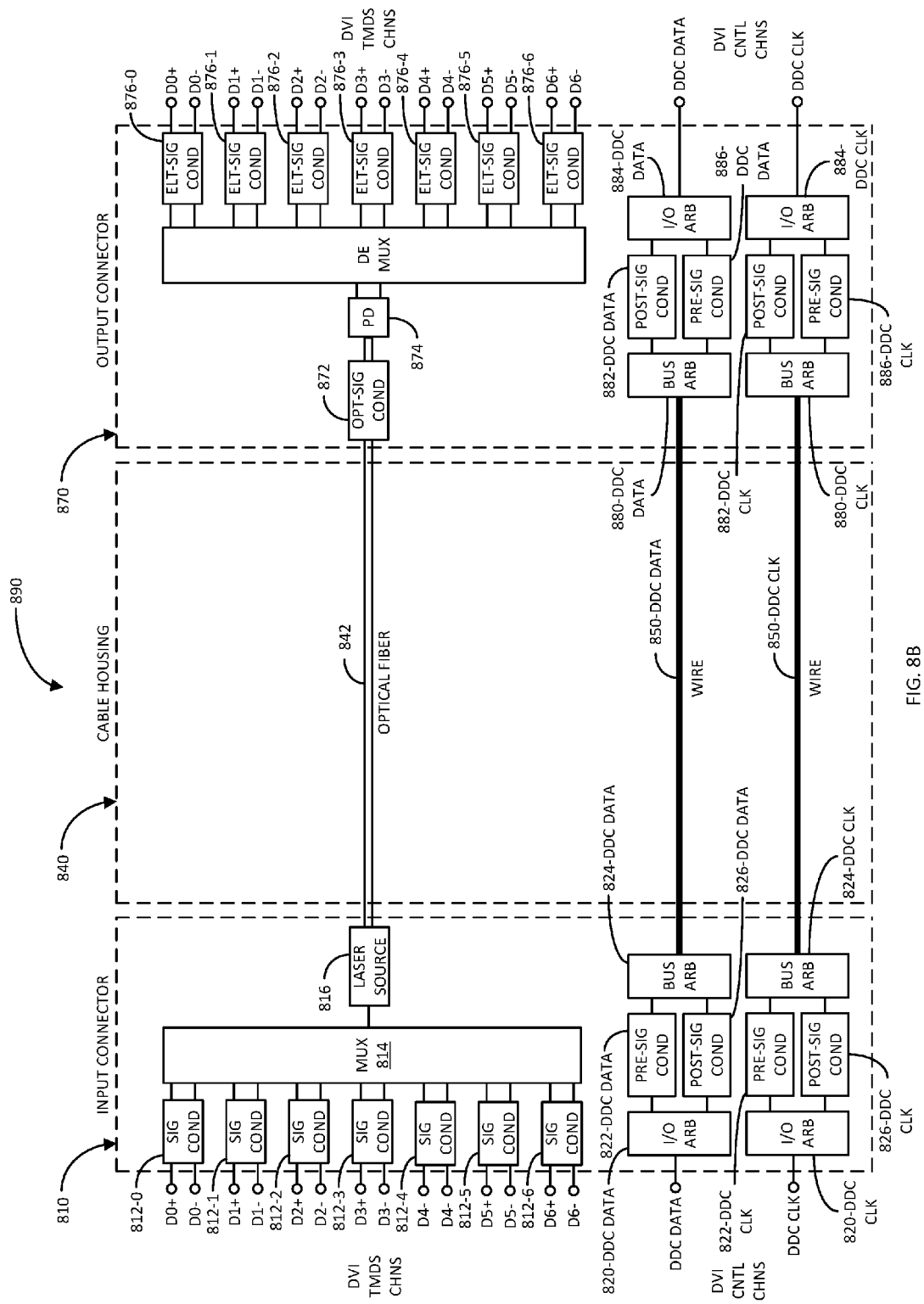

FIG. 8B illustrates a diagram of exemplary hybrid electrical-optical data communications cable 890 configured for transmitting DVI compliant signals in accordance with another aspect of the disclosure. In summary, the communications cable 890 is configured generally like communications cable 200, but specifically to transmit DVI compliant signals between a DVI data source and a DVI data sink. In particular, the communications cable 890 comprises input connector 810 for connection to a DVI data source, a cable housing 840 for protectively enclosing the transmission mediums of the cable, and an output connector 870 for connection to a DVI data sink.

The input connector 810 comprises signal conditioners 812-0, 812-1, 812-2, 812-3, 812-4, 812-5, and 812-6, multiplexer 814, and laser source 816 for converting DVI TMDS channel data D0+/D0−, D1+/D1−, D2+/D2−, D3+/D3−, D4+/D4−, D5+/D5−, and D6+/D6− received from the DVI data source into a multiplexed optical signal for transmission to the output connector 870 by way of optical fiber 842. The input connector 810 also comprises I/O arbiters 820-DDC DATA and 820-DDC CLK, pre-signal conditioners 822-DDC DATA and 822-DDC CLK, bus arbiters 824-DDC DATA and 824-DDC CLK, and post-signal conditioners 826-DDC DATA and 826-DDC CLK for processing bi-directional signals DDC DATA and DDC CLK transmitted between the input and output connectors 810 and 870 via wires 850-DDC DATA and 850-DDC CLK, respectively.

The output connector 870 comprises optical signal conditioner 872, photo detector 874, and electrical signal conditioners 876-0, 876-1, 876-2, 876-3, 876-4, 876-5, and 876-6 for converting the multiplexed optical signal received from the input connector 810 via the optical fiber 842 into DVI TMDS channel data D0+/D0−, D1+/D1−, D2+/D2−, D3+/D3−, D4+/D4−, D5+/D5−, and D6+/D6− for transmission to the DVI data sink, respectively. The output connector 870 also comprises bus arbiters 880-DDC DATA and 880-DDC CLK, post-signal conditioners 882-DDC DATA and 882-DDC CLK, I/O arbiters 884-DDC DATA and 884-DDC CLK, and pre-signal conditioners 886-DDC DATA and 886-DDC CLK for processing bi-directional signals DDC DATA and DDC CLK transmitted between the input and output connectors 810 and 870 via wires 850-DDC DATA and 850-DDC CLK, respectively.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A communications cable, comprising:
    an input connector configured to:
        connect to a data source;
        receive a first set of electrical data signals from the data source;
        receive a second set of electrical data signals from the data source; and
        provide a third set of electrical data signals from a data sink to the data source;
    an output connector configured to:
        connect to the data sink;
        provide the first set of electrical data signals to the data sink;
        provide the second set of electrical data signals to the data sink; and
        receive the third set of electrical data signals from the data sink;
    a set of one or more optical fibers coupled to the input and output connectors;
    a set of one or more electrical wires coupled to the input and output connectors;
    a first circuit configured to convert the first set of electrical data signals into an optical signal for transmission to the output connector by way of the set of one or more optical fibers;
    a second circuit configured to convert the optical signal received by way of the set of one or more optical fibers back to the first set of electrical data signals;
    a third circuit configured to apply a first signal conditioning on the second set of electrical data signals received by way of the set of one or more wires, wherein the first signal conditioning comprises amplifying, buffering, and equalizing the second set of electrical data signals; and
    a fourth circuit configured to apply a second signal conditioning on the third set of electrical data signals received by way of the set of one or more wires, wherein the second signal conditioning amplifying, buffering, and equalizing the third set of electrical data signals.

2. The communications cable of claim 1, further comprising a fifth circuit configured to apply a third signal conditioning on the second set of electrical data signals prior to transmission to the output connector by way of the set of one or more wires, wherein the third signal conditioning comprises pre-emphasizing the second set of electrical data signals.

3. The communications cable of claim 2, further comprising a sixth circuit configured to apply a fourth signal conditioning on the third set of electrical data signals prior to transmission to the input connector by way of the set of one or more wires, wherein the fourth signal conditioning comprises pre-emphasizing the third set of electrical data signals.

4. The communications cable of claim 1, wherein the second circuit comprises:
    one or more photo detectors configured to generate an electrical signal based on the optical signal; and
    one or more lenses configured to direct the optical signal to the one or more photo detectors.

5. The communications cable of claim 4, wherein the second circuit is configured to apply a third signal conditioning on the electrical signal to substantially regenerate the first set of electrical signals.

6. The communications cable of claim 1, wherein the input connector comprises a connector interface for connection to the data source, and further comprising an arbiter configured to arbitrate between the use of the connector interface for transmission of at least a portion of the second set of electrical data signals from the data source to the input connector and the use of the connector interface for transmission of at least a portion of the third set of electrical data signals from the input connector to the data source.

7. The communications cable of claim 1, wherein the output connector comprises a connector interface for connection to the data sink, and further comprising an arbiter configured to arbitrate between the use of the connector interface for transmission of at least a portion of the second set of electrical data signals from the output connector to the data sink and the use of the connector interface for transmission of at least a portion of the third set of electrical data signals from the data sink to the output connector.

8. The communications cable of claim 1, further comprising an arbiter configured to arbitrate between the use of the set of one or more wires for transmission of at least a portion of the second set of electrical data signals to the output connector and the use of the set of one or more wires for reception of at least a portion of the third set of electrical data signals from the output connector.

9. The communications cable of claim 1, further comprising an arbiter configured to arbitrate between the use of the set of one or more wires for reception of at least a portion of the second set of electrical data signals from the input connector and the use of the set of one or more wires for transmission of at least a portion of the third set of electrical data signals to the input connector.

10. The communications cable of claim 1, wherein the first circuit comprises:
    one or more laser sources configured to generate the optical signal; and a signal conditioner configured to generate one or more drive signals for the one or more laser sources based on the first set of electrical data signals.

11. The communications cable of claim 1, wherein the first circuit comprises:
one or more laser sources configured to generate the optical signal;
a signal conditioner configured to generate one or more drive signals for the one or more laser sources based on the first set of electrical data signals; and
one or more multiplexers configured to apply the one or more drive signals to the one or more laser sources.

12. The communications cable of claim 1, wherein the second circuit comprises:
one or more photo detectors configured to generate one or more electrical signals based on the optical signal; and
a signal conditioner configured to regenerate the first set of electrical data signals based on the one or more electrical signals.

13. The communications cable of claim 1, wherein the second circuit comprises:
one or more photo detectors configured to generate one or more electrical signals based on the optical signal;
a de-multiplexer configured generate one or more de-multiplexed electrical signals; and
a signal conditioner configured to regenerate the first set of electrical data signals based on the one or more de-multiplexed electrical signals.

14. The communications cable of claim 1, wherein the first, second, and third sets of electrical data signals are compliant with HDMI, DisplayPort or DVI protocol.

15. A communications cable, comprising:
an input connector configured to:
    connect to a data source;
    receive a first set of electrical data signals from the data source;
    receive a second set of electrical data signals from the data source; and
    provide a third set of electrical data signals from a data sink to the data source;
an output connector configured to:
    connect to the data sink;
    provide the first set of electrical data signals to the data sink;
    provide the second set of electrical data signals to the data sink; and
    receive the third set of electrical data signals from the data sink;
a set of one or more optical fibers coupled to the input and output connectors;
a set of one or more electrical wires coupled to the input and output connectors;
a first circuit configured to convert the first set of electrical data signals into an optical signal for transmission to the output connector by way of the set of one or more optical fibers;
a second circuit configured to convert the optical signal received by way of the set of one or more optical fibers back to the first set of electrical data signals;
a third circuit configured to apply a signal conditioning on the second set of electrical data signals, wherein the signal conditioning comprises pre-emphasizing the second set of electrical data signals at the input connector and amplifying, buffering, and equalizing the second set of electrical data signals at the output connector.

16. A communications cable, comprising:
an input connector configured to:
    connect to a data source;
    receive a first set of electrical data signals from the data source;
    receive a second set of electrical data signals from the data source; and
    provide a third set of electrical data signals from a data sink to the data source;
an output connector configured to:
    connect to the data sink;
    provide the first set of electrical data signals to the data sink;
    provide the second set of electrical data signals to the data sink; and
    receive the third set of electrical data signals from the data sink;
a set of one or more optical fibers coupled to the input and output connectors;
a set of one or more electrical wires coupled to the input and output connectors;
a first circuit configured to convert the first set of electrical data signals into an optical signal for transmission to the output connector by way of the set of one or more optical fibers;
a second circuit configured to convert the optical signal received by way of the set of one or more optical fibers back to the first set of electrical data signals;
a third circuit configured to apply a signal conditioning on the third set of electrical data signals, wherein the signal conditioning comprises pre-emphasizing the third set of electrical data signals at the output connector and amplifying, buffering, and equalizing the third set of electrical data signals at the input connector.

* * * * *